United States Patent [19]
Rinaldi

[11] Patent Number: 6,000,496
[45] Date of Patent: Dec. 14, 1999

[54] FLEXIBLE STEP ASSEMBLY FOR VEHICLES

[76] Inventor: Randal D. Rinaldi, 22433-29th Avenue, Bellevue, Alberta, Canada, T0K 0C0

[21] Appl. No.: 08/819,515

[22] Filed: Mar. 17, 1997

[30] Foreign Application Priority Data

Jun. 3, 1996 [CA] Canada ................................ 2178023

[51] Int. Cl.$^6$ .................................................. E04G 3/00
[52] U.S. Cl. ........................ 182/127; 182/196; 182/200; 182/228.1
[58] Field of Search ................. 182/90, 91, 100, 182/2–11, 127, 166, 186–189, 196, 197, 200, 201, 207, 228.1; 403/109.3, 377

[56] References Cited

U.S. PATENT DOCUMENTS

| | | | |
|---|---|---|---|
| 3,033,309 | 5/1962 | Fugere | 182/90 |
| 3,967,695 | 7/1976 | Waddell | 182/90 X |
| 4,333,547 | 6/1982 | Johansson | 182/90 |
| 4,359,138 | 11/1982 | Kummerlin et al. | 182/200 X |
| 4,564,205 | 1/1986 | Shookman et al. | 182/90 X |
| 5,024,292 | 6/1991 | Gilbreath et al. | 182/127 X |
| 5,064,023 | 11/1991 | Loeber | 182/127 X |
| 5,335,752 | 8/1994 | Kozlowski | 182/127 |
| 5,628,380 | 5/1997 | Matisi | 182/196 X |

*Primary Examiner*—Daniel P. Stodola
*Assistant Examiner*—Bruce A. Lev
*Attorney, Agent, or Firm*—Bennett Jones

[57] ABSTRACT

A flexible step assembly for vehicles which includes a number of vertically disposed horizontal steel tread members attached at their ends to flexible side members. A spring loaded assembly is attached to the upper ends of each side member, the spring loaded assembly is of two part construction, top part being fixed to a location on the vehicle for use, the lower part being separable under impact from the top part, but upon release of loading is recoupled by the spring and its associated components.

18 Claims, 3 Drawing Sheets

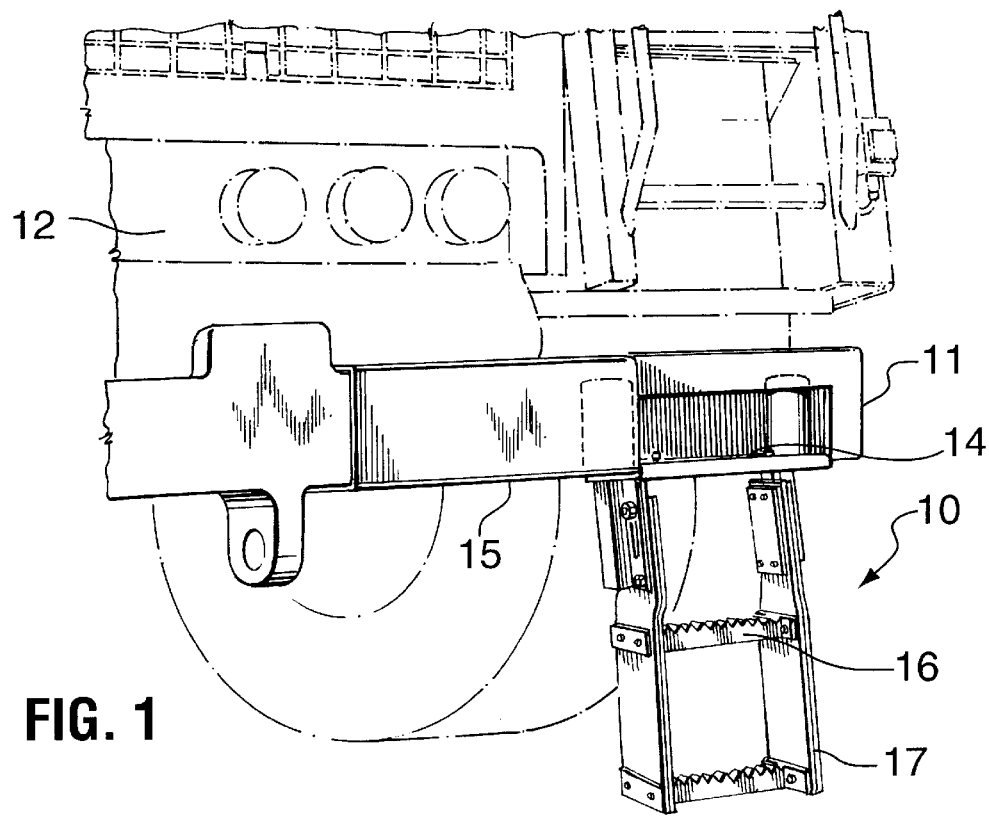
FIG. 1
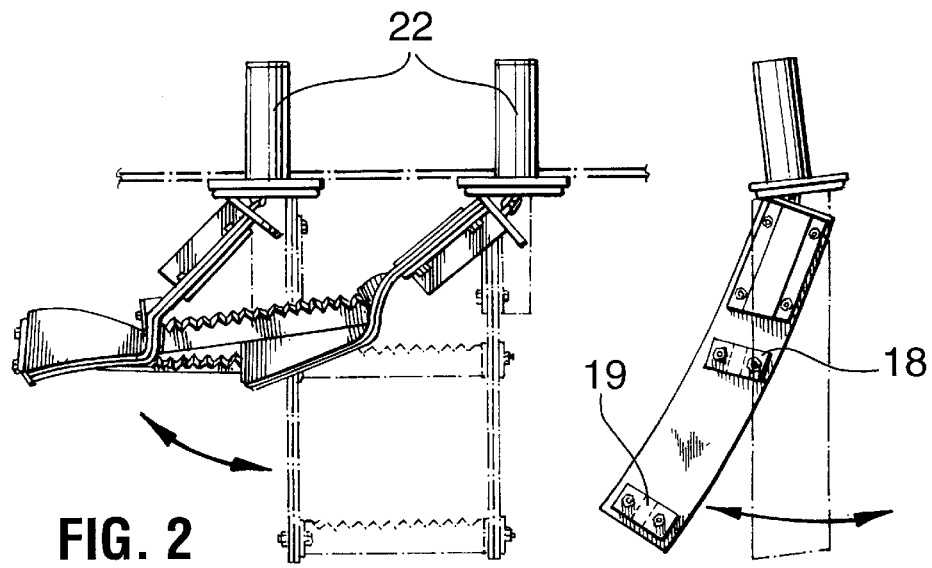
FIG. 2
FIG. 3

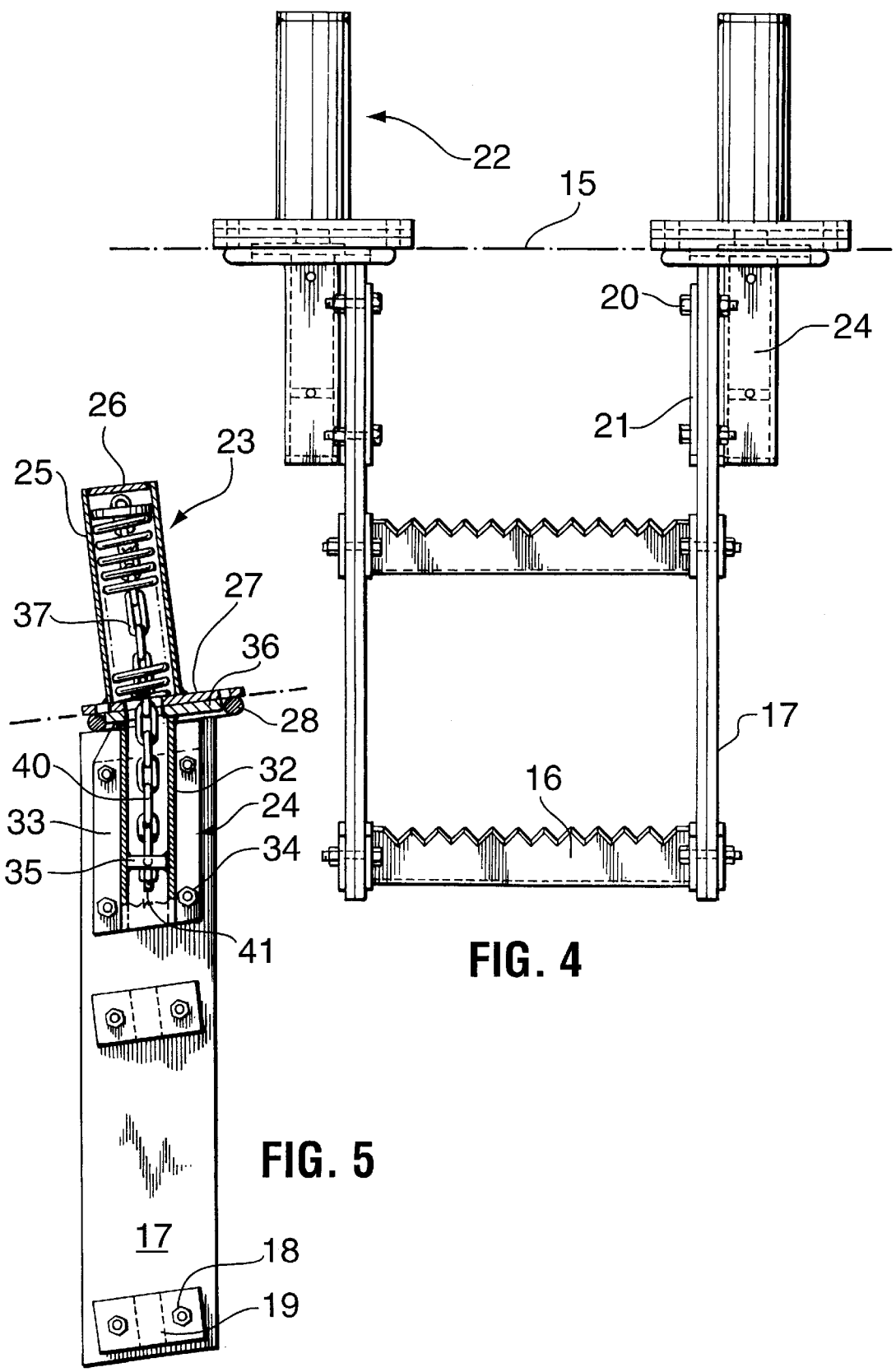

FLEXIBLE STEP ASSEMBLY FOR VEHICLES

BACKGROUND OF THE INVENTION

The invention relates in general to a flexible step assembly for attachment to and for use on vehicles, particularly of the commercial type, namely vehicles used for industrial purposes such as road making equipment and heavy farm equipment.

There has long been a requirement for steps to be provided to allow operators or maintenance personnel ready access to, for example, the body of large vehicles.

Such step assemblies have been provided as permanent structures, fixedly attached to depend from the vehicle chassis. However, due to the nature of the terrain over which these vehicles operate, these prior assemblies are easily damaged by impact with the ground or other obstructions, and are constantly in need of repair and/or replacement.

SUMMARY OF THE INVENTION

It is therefore a principle object of the present invention to provide a step assembly that is on the one hand flexible enough to withstand high impact without substantial damage and on the other hand to provide a rigid enough structure to withstand normal use without flexing under the weight of the user.

The invention therefore comprises a flexible step assembly for vehicles including in combination, a plurality of horizontally extending tread members equidistantly spaced one above the other and anchored at each of their ends to a flexible, vertically depending side member. A shock absorber assembly is operably attached to the uppermost section of each of the side members each shock absorber assembly comprising an upper and lower interconnected section, each of said two interconnected sections being independently and partially separable under impact sufficient to permit the step assembly to move in the direction of impact such that damage to the step assembly is substantially prevented. Each shock absorber assembly includes a spring arrangement adapted for interconnection between each of the two interconnected or intercoupled sections, the spring assembly serving to recouple the two interconnected sections as separated by impact to return the step assembly to the in use position.

BRIEF DESCRIPTION OF THE DRAWINGS

The invention will now be described, by way of example only, reference being had to the accompanying drawings in which:

FIG. 1. shows a step assembly according to the invention operably mounted in relation to the front bumper of a vehicle;

FIG. 2 is a schematic representation of the step assembly of FIG. 1 under side impact;

FIG. 3 is a side elevational view of the step assembly under front impact;

FIG. 4 is a front elevational view of the step assembly according to the invention;

FIG. 5 is a side elevational view of the step assembly of FIG. 4, in part section.

DESCRIPTION OF THE PREFERRED EMBODIMENTS

Figure 6:
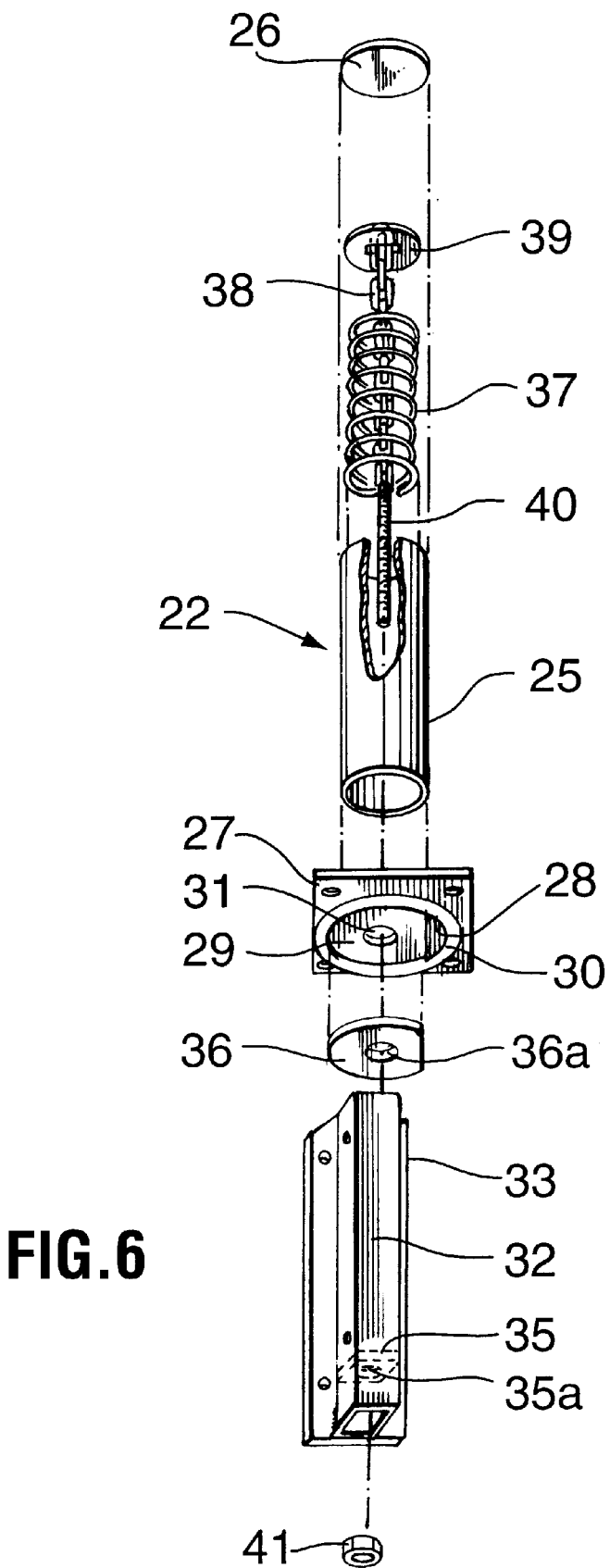
FIG. 6 is an exploded view of the component parts which form the shock absorbing system, shown in part section on FIG. 5.

Looking specifically at the drawings, FIG. 1 shows the general arrangement of the step assembly 10 mounted to the front bumper 11 of a large vehicle 12 (shown in phantom outine). While various mounting methods are available, in this embodiment, attachment is by bolts 14 to the bottom flange 15 of the bumper 11.

The step construction itself comprises in this specific embodiment, two tread sections 16 which are formed of steel, and mounted to extend between two sided members 17, formed from substantially thick rubber material. The tread sections 16 are attached to each side member 17 by bolts 18 and reinforcing plates 19. As can be seen from FIG. 4, the plates 19 and bolts 18 sandwich a two-ply rubber reinforced belting.

Each composite side member 17 is attached as by bolts 20 and reinforcing plate 21 to an associated shock absorber system, generally indicated at 22, the separate components can be seen in more detail in FIGS. 5 and 6.

System 22 comprises essentially in two separable sections 23 and 24. Upper section 23 comprises a tubular member 25, closed off at its upper end by a cap 26, and attached as to welding at its opposite lower end by a flange 27. Flange 27 being adapted to be attached, as by bolts directly to the chassis of the vehicle, or by way of a bumper attachment (not shown). The underside of flange 27 is provided with a circular perturbulence 28, which is recessed at 29. The configuration of the recess being substantially circular but with a straight-edged portion 30. A hole 31 is provided through flange 27 which when welded to member 25 is in axial alignment with the center of member 25.

Looking now to bottom section 24, this as can be seen from FIG. 6 comprises a length of open-ended square steel tubing 32 welded to a backing plate 33, the latter being the means by which the assembly is attached, by bolts 34, to a side member 17. Inside tubing 32 and located a short distance from the bottom of the tube is a member 35 which is attached internal to the walls of tube 32 as by welding. Member 35 is provided with a centrally aligned hole 35A extending axially therethrough.

The final component of section 24 is a top-plate 36 which is attached as by welding to the top of tribe 32 to close off same. Plate 36 is configured dimensionally to fit and to seat within recess 29 on the underside of flange 27 of upper section 23. A centrally aligned hole 36A is provided in plate 36.

Top and bottom sections 23 and 24 are coupled together to form a shock or impact loading assembly, by the provision of a spring 37; chain 38 with associated top cap 39; threaded rod 40, and bottom nut 41. As can be seen from FIG. 5, the spring 37 is contained within tubular member 25 of top section 23, and chain 38 passes centrally through spring 37 and is connected to top cap or plate 39.

Chain 38 extends from top section 23 into bottom section 24, through hole 31 in flange 27; through hole 36A and plate 36 to be attached to the top of threaded rod 40. Rod 40 then passes through hole 35A to be finally secured by nut 41.

By tightening nut 41, spring 37 is drawn into compression, plate 36 is snugly located within a recess 29 thus bringing the entire assembly into tension, ie: the spring under compression, to maintain the steps in a vertical and downwardly extending position.

By adjusting the spring compression the steps remain essentially rigid when being ascended by an operator, for example, the utilization of springs which require approximately 1300 pounds pressure to compress, is sufficient to hold a 225 pound person, and not deviate from the vertical position when being used.

It will also be appreciated from the above description that when the step assembly is under impact loads from any direction, the springs 37 will allow the lower section 24 of the shook absorbing assembly to partially separate from the upper section 23 in the area of plate 36 and its interrelationship with recess 29 in flange 27. Plate 36 will be forced out of recess 29 on impact, which will permit approximately 90 degrees of movement, in the direction of impact, of the step assembly. After impact, however, the spring 37 will return the assembly back to its original vertical position, wherein plate 36 will, by virtue of its configuration mate back into the same position with recess 29. In other words, the orientation of the assembly following spring return will be as before impact.

It is to be understood that the embodiment of the invention herein described is merely illustrative of the application of the principles of the invention. Reference herein to details of the illustrated embodiment is not intended to limit the scope of the claims which themselves recite those features regarded as essential to the invention.

The scope of the invention is therefore to be considered broadly defined and is specified in the appended claims.

What I claim is:

1. A flexible step assembly for vehicles comprising in combination: a first flexible, vertically depending side member and a second flexible, vertically depending side member, each of the first and the second side members having an upper portion; at least one horizontally extending tread member attached between the first and the second side members; a first shock absorbing means operably connected to the upper portion of the first side member and a second shock absorbing means operably connected to the upper portion of the second side member, each of the first and second shock absorbing means including an upper section and a lower section, the upper section and the lower section being interconnected and partially separable under impact, sufficient to permit the step assembly to move in a direction of impact such that damage of the step assembly due to impact is substantially prevented, each of the first and the second shock absorbing means including a spring adapted for interconnection between the upper section and the lower section, the spring serving to recouple the upper section and the lower section when separated by impact and the upper section of each of the first and the second shock absorbing means comprise an elongate hollow tubular member having a lower opening and a flange extending about the lower opening, the flange having a recess on its bottom surface and wherein the lower section of each of the first and the second shock absorbing means comprises a plate, the plate being configured to interlock with the recess on the flange.

2. The flexible step assembly according to claim 1 wherein the spring means includes a compression spring.

3. The flexible step assembly according to claim 1 wherein the first and the second side members are of rubber.

4. The flexible step assembly according to claim 1 wherein the plate and the recess are formed to correspond so that the plate can interlock with the recess in one orientation only.

5. The flexible step assembly according to claim 1 the elongate tubular member of the upper section being closed at a top end and housing the spring, the spring being a compression spring, a cap disposed within the elongate tubular member above the compression spring and free to ride vertically within the elongate tubular member, a chain attached to the cap and extending centrally through the spring, through the lower opening of the elongate member and being connected to the lower section.

6. The flexible step assembly according to claim 1 wherein the upper section of each of the first and the second shock absorbing means is adapted to be fixedly held on a portion of a vehicle.

7. A flexible step assembly for vehicles comprising in combination: a pair of flexible, vertically depending side members, each of the pair of side members having an upper portion; at least one horizontally extending tread member attached between the side members; a shock absorbing means operably connected to the upper portion of each side member, each of the shock absorbing means including an upper section and a lower section, the upper section and the lower section being interconnected and partially separable under impact, sufficient to permit the step assembly to move in a direction of impact such that damage by impact to the step assembly is substantially prevented, the upper section of each shock absorbing means including an elongate tubular member having a lower opening and being closed at a top end, the elongate tubular member housing a compression spring adapted to act between the upper section and the lower section serving to recouple the upper section and the lower section when separated by impact; a cap disposed within the elongate tubular member above the compression spring and being free to ride vertically within the elongate tubular member, a chain attached to the cap and extending centrally through the spring, through the lower opening of the elongate tubular member and being connected to the lower section.

8. The flexible step assembly according to claim 7 wherein the side members are of rubber.

9. The flexible step assembly according to claim 7 wherein a flange extends about the lower opening, the flange having a recess on its bottom surface and the lower section of each shock absorbing means comprises a plate, the plate being configured to interlock with the recess on the flange.

10. The flexible step assembly according to claim 9 wherein the plate and the recess are formed to correspond so that the plate can interlock with the recess in one orientation only.

11. The flexible step assembly according to claim 7 wherein the upper section of the shock absorbing means is adapted to be fixedly held on a portion of a vehicle.

12. The flexible step assembly according to claim 7 wherein the lower section of the shock absorbing means includes an intermediate member formed with a hole therethrough and the chain means has attached thereto at an end opposite the cap a threaded rod, the threaded rod extending through the hole of the intermediate member and nut means threadedly engaged on the threaded rod below the intermediate member.

13. A flexible step assembly for vehicles comprising in combination: a pair of flexible, vertically depending side members, each of the pair of side members having a upper portion; at least one horizontally extending tread member attached between the side members; a shock absorbing means operably connected to the upper portion of each side member, each of the shock absorbing means including an upper section and a lower section, the upper section and the lower section being interconnected and partially separable under impact, sufficient to permit the step assembly to move in the direction of impact such that damage due to impact to the step assembly is substantially prevented, the shock absorbing means including spring means adapted for interconnection between the upper section and the lower section, the spring means serving to recouple the upper section and the lower section when separated by impact; the upper section of each shock absorbing means comprising an elongate tubular member having a lower opening and a flange extending about the lower opening, the flange having a recess on its bottom surface and wherein the lower section of each shock absorbing means comprises a plate, the plate being configured to interlock with the recess on the flange.

14. The flexible step assembly according to claim 13 wherein the plate and the recess are formed to correspond so that the plate can interlock with the recess in one orientation only.

15. The flexible step assembly according to claim 13 wherein the spring means includes a compression spring.

16. A flexible step assembly according to claim 13 wherein the side members are of rubber.

17. The flexible step assembly according to claim 13 the elongate tubular member of the upper section being closed at a top end and housing the spring, the spring being a compression spring; a cap disposed within the elongate tubular member above the compression spring and free to ride vertically within the elongate tubular member, a chain attached to the cap and extending centrally through the spring through the lower opening of the elongate member and being connected to the lower section.

18. The flexible step assembly according to claim 13 wherein the upper section of the shock absorbing means is adapted to be fixedly held on a portion of a vehicle.

\* \* \* \* \*